United States Patent
Hu et al.

(10) Patent No.: US 10,223,854 B2
(45) Date of Patent: Mar. 5, 2019

(54) VEHICLE MANAGEMENT METHOD, MANAGEMENT DEVICE MOUNTED ON VEHICLE AND VEHICLE

(71) Applicant: BEIJING MOBIKE TECHNOLOGY CO., LTD., Beijing (CN)

(72) Inventors: Weiwei Hu, Beijing (CN); Hongdu Jin, Beijing (CN); Yi Yang, Beijing (CN)

(73) Assignee: BEIJING MOBIKE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/799,211

(22) Filed: Oct. 31, 2017

(65) Prior Publication Data
US 2018/0322721 A1    Nov. 8, 2018

(30) Foreign Application Priority Data
May 5, 2017 (CN) .......... 2017 1 0313326

(51) Int. Cl.
| | |
|---|---|
| G06F 7/00 | (2006.01) |
| G07C 9/00 | (2006.01) |
| B60R 25/24 | (2013.01) |
| E05B 71/00 | (2006.01) |
| G06Q 30/06 | (2012.01) |
| G06Q 10/00 | (2012.01) |
| G07F 17/00 | (2006.01) |

(52) U.S. Cl.
CPC .......... *G07C 9/00571* (2013.01); *B60R 25/24* (2013.01); *E05B 71/00* (2013.01); *G06Q 10/00* (2013.01); *G06Q 30/0645* (2013.01); *G07C 9/00309* (2013.01); *G07C 9/00896* (2013.01); *G07F 17/0057* (2013.01)

(58) Field of Classification Search
None
See application file for complete search history.

(56) References Cited

U.S. PATENT DOCUMENTS

| | | | |
|---|---|---|---|
| 2009/0153294 A1* | 6/2009 | Katagiri | B60R 25/246 340/5.61 |
| 2011/0037240 A1* | 2/2011 | Kritzer | E05B 47/0603 280/293 |
| 2011/0307394 A1* | 12/2011 | Rzepecki | G06Q 30/00 705/307 |
| 2017/0039668 A1* | 2/2017 | Luke | B60L 11/1861 |
| 2018/0100933 A1* | 4/2018 | Xia | G01S 19/47 |

FOREIGN PATENT DOCUMENTS

CN    105046827 A    11/2015

* cited by examiner

*Primary Examiner* — Brent Swarthout
(74) *Attorney, Agent, or Firm* — Michele V. Frank; Venable LLP

(57) ABSTRACT

The present invention discloses a vehicle management method, a management device mounted on a vehicle, and a vehicle. The method comprises: setting a vehicle in a free-to-use state in advance; receiving a use request by a management device mounted on the vehicle from a user terminal, the use request including an identification of the user terminal and verification information; verifying the user terminal by the management device; when the verification succeeds, marking by the management device the vehicle with a legal use mark, and continuing the free-to-use state of the vehicle. According to one embodiment of the present invention, the user experience can be enhanced.

18 Claims, 3 Drawing Sheets

VEHICLE MANAGEMENT METHOD, MANAGEMENT DEVICE MOUNTED ON VEHICLE AND VEHICLE

CROSS-REFERENCE TO RELATED APPLICATIONS

This application claims priority to Chinese Patent Application No. 201710313326.3, filed on May 5, 2017, which is hereby incorporated by reference in its entirety.

FIELD OF THE INVENTION

The present invention relates to the technical field of vehicle management, and more particularly to a vehicle management method, a device vehicle management mounted on a vehicle and a vehicle.

BACKGROUND OF THE INVENTION

In recent years, "shared technology" becomes a term with a very high exposure rate. The core of the shared technology lies in a target of using idle and discrete offline resources rather than occupying them to maximize the utilization rate thereof and save cost. The shared technology represents a new technology direction in the current society which advocates environmental protection and resource saving.

In a current shared bicycle system, before a user begins to use a bicycle, the bicycle is in a locked state. When using the bicycle, the user needs to scan a two-dimensional code on the bicycle through a cell phone or directly input a bicycle code so as to unlock the bicycle. In some shared bicycle systems, a user needs to manually input an unlocking password obtained from a server and toggle a lock tongue to unlock the bicycle. In such a system, a client device on the cell phone needs to report information of the vehicle to be used to the server and waits for the server to send the unlocking password. In addition, it is also possible to require the user to manually input a password. Therefore, the user needs to wait for a period of time before using the shared bicycle, which will bring bad use experience.

For example, the patent application No. 201510319473.2 discloses an improved shared bicycle system. In this bicycle system, a user scans a two-dimensional code stuck on a bicycle through a user device such as a cell phone to obtain ID information of the bicycle, and sends the ID information and user information to a backend server for verification. In case of successful verification, the backend server will send an unlocking command to an intelligent lock on the bicycle. After receiving the unlocking command, the intelligent lock automatically opens the physical lock, and the backend server starts to bill. The user starts to use the bicycle. When returning the bicycle, the user manually locks the intelligent lock, which perceives the locking action and informs the backend server that the bicycle is returned. Then the backend server performs billing.

However, in this shared bicycle system, the user can start to use the bicycle only after the verification, which deteriorates the use experience. For example, if the cell phone network signal or vehicle lock GPRS signal is poor, due to delay of signal transmission, it is possible that the unlocking time is prolonged.

The above takes bicycles as an example to indicate problems existing in the shared bicycle technology. The shared technology may be further applied to automobiles, motorcycles, electric vehicles and the like. Similar problems exist in the shared technology for these vehicles.

Therefore, there is a need to provide a new technical solution to solve at least one of the technical problems in the current technology.

SUMMARY OF THE INVENTION

An objective of the present invention is to provide a novel technical solution for vehicle control.

According to the first aspect of the present invention, there is provided a vehicle management method. The method comprises the following steps: setting a vehicle in a free-to-use state in advance; receiving a use request by a management device mounted on the vehicle from a user terminal, the use request including an identification of the user terminal and verification information; verifying the user terminal by the management device; and when the verification succeeds, marking by the management device the vehicle with a legal use mark, and continuing the free-to-use state of the vehicle.

Optionally, the method further comprises: when the verification fails, continuing by the management device the free-to-use state of the vehicle.

Optionally, the method further comprises: receiving by the management device a notification of stopping use of the vehicle from the user terminal, the notification including the identification of the user terminal; and after receiving the notification, canceling the legal use mark by the management device.

Optionally, in the method, the use request further includes balance data of the user terminal; and after receiving the notification, the management device calculates an amount consumed by the user and sends a command of rewriting the balance data to the user terminal Optionally, in the method, the management device acquires a riding state of the vehicle; when the management device counts time from a start of the riding state, if the time reaches a first preset time and the vehicle does not have the legal use mark, the vehicle is switched from the free-to-use state to a prohibited state to prohibit the user from using the vehicle.

Optionally, in the method, before the management device switches the vehicle to the prohibited state, the management device prompts the user that the vehicle will be prohibited using at least one of a message displayed on a vehicle screen, a sound, a vibration and light.

Optionally, in the method, the management device acquires a riding state of the vehicle; when the management device counts time from a start of the riding state, if the time reaches a first preset time and the vehicle does not have the legal use mark, the user is warned to stop using the vehicle by a sound.

Optionally, in the method, if the time reaches a second preset time and the vehicle does not have the legal use mark, the management device prompts the user to perform verification using at least one of a message displayed on a vehicle screen, a sound, a vibration and light, the second preset time being smaller than the first preset time.

Optionally, in the method, the management device acquires the riding state of the vehicle by determining a position change of the vehicle.

Optionally, in the method, the management device determines the riding state by detecting at least one of a seat pressure and a wheel rotation state.

Optionally, in the method, the management device sets the vehicle in a prohibited state by activating at least one of a lock and a vehicle braking means.

Optionally, in the method, the user terminal is a smart card or an electronic device carrying a virtual smart card, and the management device includes a card swiping means.

Optionally, in the method, the user terminal and the management device communicate with each other by NFC.

Optionally, in the method, the user terminal and the management device communicate with each other by Bluetooth; and the user terminal activates an operation of sending the use request to the management device by scanning a code.

Optionally, in the method, the management device records a use condition of the vehicle for each time of use, and periodically report the use condition to a server.

According to the second aspect of the present invention, there is provided a management device mounted on a vehicle, comprising a memory and a processor, wherein the memory stores executable instructions for controlling the processor to perform the operations of: setting a vehicle in a free-to-use state in advance; receiving a use request from a user terminal, the use request including an identification of the user terminal and verification information; verifying the user terminal based on the verification information; and when the verification succeeds, marking by the management device the vehicle with a legal use mark, and continuing the free-to-use state of the vehicle.

Optionally, the executable instructions are further configured for controlling the processor to perform the operation of: when the verification fails, continuing the free-to-use state of the vehicle.

Optionally, the executable instructions are further configured for controlling the processor to perform the operations of: receiving a notification of stopping use of the vehicle from the user terminal, the notification including the identification of the user terminal; and after receiving the notification, canceling the legal use mark.

Optionally, the use request further includes balance data of the user terminal, and the executable instructions are further configured for controlling the processor to perform the operation of: after receiving the notification, calculating an amount consumed by the user and sending a command of rewriting the balance data to the user terminal.

Optionally, the executable instructions are further configured for controlling the processor to perform the operations of: acquiring a riding state of the vehicle; counting time from a start of the riding state, and if the time reaches a first preset time and the vehicle does not have the legal use mark, switching the vehicle from the free-to-use state to a prohibited state to prohibit a user from using the vehicle.

Optionally, the executable instructions are further configured for controlling the processor to perform the operation of: before switching the vehicle to the prohibited state, prompting the user that the vehicle will be prohibited using at least one of a message displayed on a vehicle screen, a sound, a vibration and light.

Optionally, the executable instructions are further configured for controlling the processor to perform the operations of: acquiring a riding state of the vehicle; counting time from a start of the riding state, and if the time reaches a first preset time and the vehicle does not have the legal use mark, warning the user to stop using the vehicle by a sound.

Optionally, the executable instructions are further configured for controlling the processor to perform the operation of: if the time reaches a second preset time and the vehicle does not have the legal use mark, prompting the user to perform verification using at least one of a message displayed on a vehicle screen, a sound, a vibration and light, the second preset time being smaller than the first preset time.

Optionally, the management device acquires the riding state of the vehicle by determining a position change of the vehicle.

Optionally, the management device determines the riding state by detecting at least one of a seat pressure and a wheel rotation state.

Optionally, the management device sets the vehicle in a prohibited state by activating at least one of a lock and a vehicle braking means.

Optionally, the management device includes a card swiping means.

Optionally, the user terminal and the management device communicate with each other by NFC or Bluetooth.

Optionally, the executable instructions are further configured for controlling the processor to perform the operation of: recording a use condition of the vehicle for each time of use, and periodically reporting the use condition to a server.

According to the third aspect of the present invention, there is provided a vehicle including any of the above management devices.

According to one embodiment of the present invention, the user experience can be enhanced.

Other features and advantages of the present invention will become apparent from the following detailed description of exemplary embodiments of the present invention with reference to the accompanying drawings.

BRIEF DESCRIPTION OF THE DRAWINGS

In order to illustrate the technical schemes of the embodiments provided by the present disclosure more clearly, a brief introduction may be given hereinafter to the drawings that may be used in the description of the embodiments. Apparently, the drawings in the description below are merely for illustrating some embodiments of the present disclosure, and other drawings may be obtained by those skilled in the art according to these drawings without paying any creative labor.

DETAILED DESCRIPTION OF THE EMBODIMENTS

Figure 1:
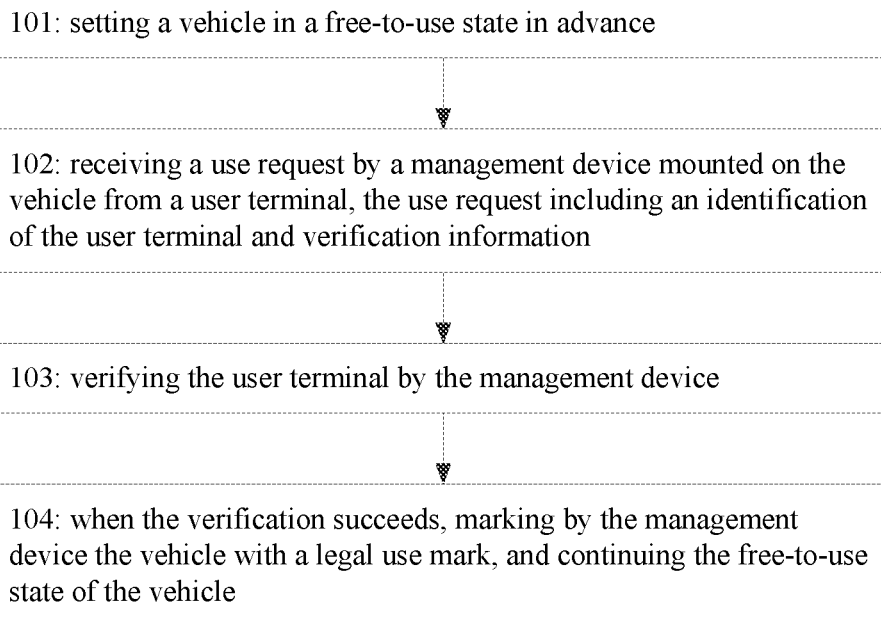
FIG. 1 is a schematic drawing of a flow chart of a vehicle management method according to an embodiment of the present invention in which a vehicle is legally used.

Various exemplary embodiments of the present invention will now be described in detail with reference to the accompanying drawings. It should be noted that the relative arrangement, numerical expressions and numerical values of the components and steps set forth in these embodiments do not limit the scope of the present invention unless otherwise specified.

The following description of at least one exemplary embodiment is in fact merely illustrative and is in no way intended as a limitation to the present invention and its application or use.

Techniques, methods, and devices known to those of ordinary skill in the relevant art may not be discussed in detail but where appropriate, the techniques, methods, and devices should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, there is no need for further discussion in the accompanying drawings.

The followings will describe the embodiments and examples of the present invention with reference to the drawings. Here, the user may use the vehicle in a sharing manner.

<Overall Structure of a Shared Vehicle System>

Figure 6:
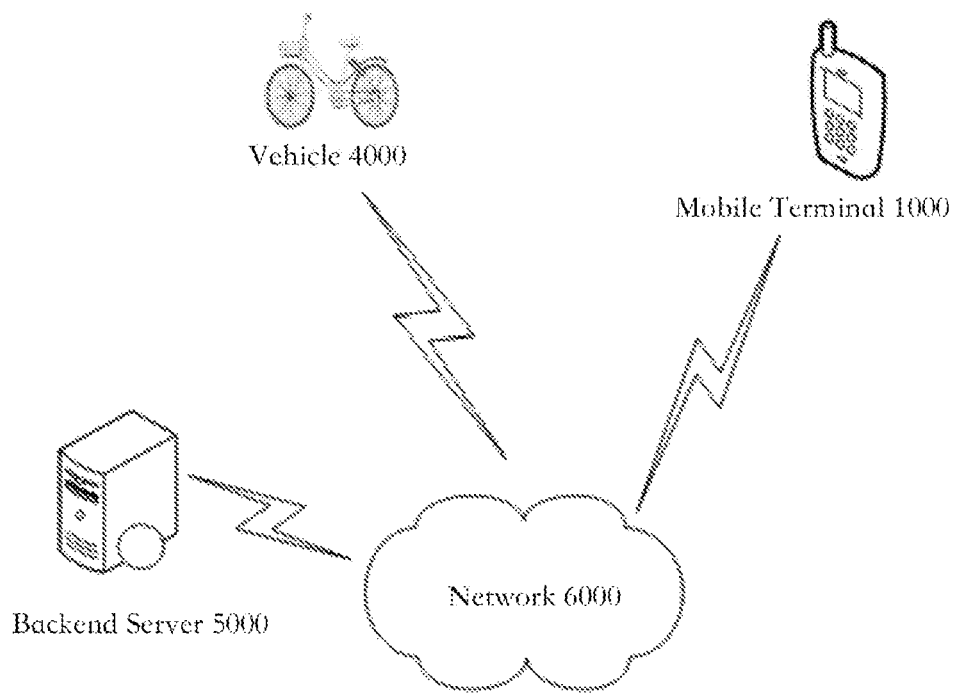
FIG. 6 is a schematic drawing of the overall structure of a shared vehicle system according to an embodiment of the present invention.

FIG. 6 is a schematic drawing of the overall structure of a shared vehicle system according to an embodiment of the present invention.

As shown in FIG. 6, the shared vehicle system may include a mobile terminal 1000, a backend server 5000 and a vehicle 4000, and the three of which may establish communication connections with one another via a wireless network 6000.

The vehicle 4000 includes a two-dimensional code and/or a code for uniquely identifying a corresponding vehicle.

The user may scan the two-dimensional code of the vehicle 4000 via the mobile terminal 1000, and send the two-dimensional code information to the backend server 5000 to perform an unlocking operation.

The user may also input or recognize the code of the vehicle 4000 via the mobile terminal 1000, and send the code information to the backend server 5000 to perform an unlocking operation.

When the user scans the two-dimensional code of the vehicle 4000 or input the code thereof via the mobile terminal 1000, the user needs to use a function of the mobile terminal 1000, such as a flashlight function, a camera function and the like of the mobile terminal 1000.

In the present invention, the mobile terminal 1000 may send or receive signals via a wired or wireless network for example, or may process the signals in a memory for example, or store the signals in a physical storage state. Each mobile terminal may be an electronic device including hardware, software or an inbuilt logic assembly or two or more of such assemblies used to execute suitable functions supported by the mobile terminal. For example, the mobile terminal may be a smart cell phone, a tablet computer, a portable email device, an electronic book, a handheld gaming machine and/or game controller, a notebook computer, an Internet surfing computer, a handheld electronic device, a smart wearable device or the like. The present invention covers any suitable mobile terminal. The mobile terminal may enable its user to access a network.

The mobile terminal 1000 may include a processing device including an application processing part and a radio frequency/digital signal processor, and may include a memory device including a ROM, a RAM, a flash memory or any combination thereof.

In addition, various client applications may be installed in the mobile terminal 1000 to allow the mobile terminal 1000 to transmit commands suitable for operations with other devices. Such applications may be downloaded from a server and may be installed in the memory of or pre-installed in the mobile terminal 1000. In the present invention, the mobile terminal 1000 is installed with a vehicle client terminal application which can help the user use the functions of the vehicle 4000.

In the present invention, the backend server 5000 is a server. The server in this description should be understood as a service point providing processing, database and communication facilities. For example, the server may be a single physical processor including related communication, data storage and database facilities, or a networked or clustered processor, or a cluster of related networks and storage devices, and can operate software, one or more database and application software providing services supported by the server. The servers may vary greatly in configuration or performance, but generally the server may include one or more central processing units and memories. The server further include one or more large-volume storage devices, one or more power sources, one or more wired or wireless network interfaces, one or more input/output interfaces, one or more operating systems such as Windows Server, Mac OS X, Unix, Linux and FreeBSD, and the like. Specifically, the backend server 5000 may be an integral server or a distributed server across multiple computers or computer data centers. The server may include various servers, such as but not limited to a network server, a news server, a mail server, a message server, an advertisement server, a file server, an application server, an interactive server, a database server or a proxy server. In some embodiments, each server may include hardware, software or an inbuilt logic assembly or two or more of such assemblies used to execute suitable functions supported by the server. In the present invention, the backend server 5000 is used to provide all functions required for using the vehicle.

In the present invention, the vehicle 4000 may be a bicycle, a tricycle, an electric scooter, a motor cycle, a four-wheeled vehicle or the like.

In the present invention, the wireless network 6000 covers any suitable wireless network, such as but not limited to a 4G network, a 3G network, a GPRS network, a Wi-Fi network or the like. In addition, the wireless network coupling the backend server 5000 and the mobile terminal 1000 and the wireless network coupling the backend server 5000 and the vehicle 4000 may be the same or different.

<Vehicle Management Methods>

FIG. 1 is a schematic drawing of a flow chart of a vehicle management method according to an embodiment of the present invention in which a vehicle is legally used. As shown in FIG. 1, the method includes the following steps:

101: setting a vehicle in a free-to-use state in advance;

102: receiving a use request by a management device mounted on the vehicle from a user terminal, the use request including an identification of the user terminal and verification information;

103: verifying the user terminal by the management device; and

104: when the verification succeeds, marking by the management device the vehicle with a legal use mark, and continuing the free-to-use state of the vehicle.

In the current technology, except being used by users, the shared vehicle is not usable; for example the vehicle is in a locked state. When users want to use the vehicle, verification is firstly needed. Only when the verification passes, will the vehicle become usable; for example the vehicle lock is opened, and the user can use the vehicle. In the present invention, the vehicle is set in a free-to-use state in advance; that is to say, the vehicle itself is usable.

In the present invention, the vehicle itself is provided with a management device. When the user wants to use the vehicle, the user may send a use request to the vehicle through the terminal, the use request including the identification of the user terminal and verification information. The user terminal is verified by the management device, and if the verification successes, the management device marks the vehicle with a legal use mark and maintains the free-to-use state of the vehicle. Then the user can use the vehicle normally.

In one embodiment, if the verification of step 103 fails, the management device maintains the free-to-use state of the vehicle.

When the user finishes using the vehicle, a notification of the termination of the use of the vehicle can be sent to the management device of the vehicle through the user terminal, the notification including the identification of the user terminal; and the management device, upon receiving the notification, will cancel the legal use mark.

In a specific example, the use request also includes the balance data of the user terminal; the management device calculates the consumption amount of the user after receiving the notification of the termination of the use of the vehicle and sends a command of overwriting the balance data to the user terminal, and the user terminal rewrites itself balance data after receiving the command of overwriting the balance data. The vehicle management device also periodically sends the vehicle use record and the user consumption record to the vehicle management server at the cloud end, and the vehicle management server updates the balance data of the user terminal.

Figure 2:
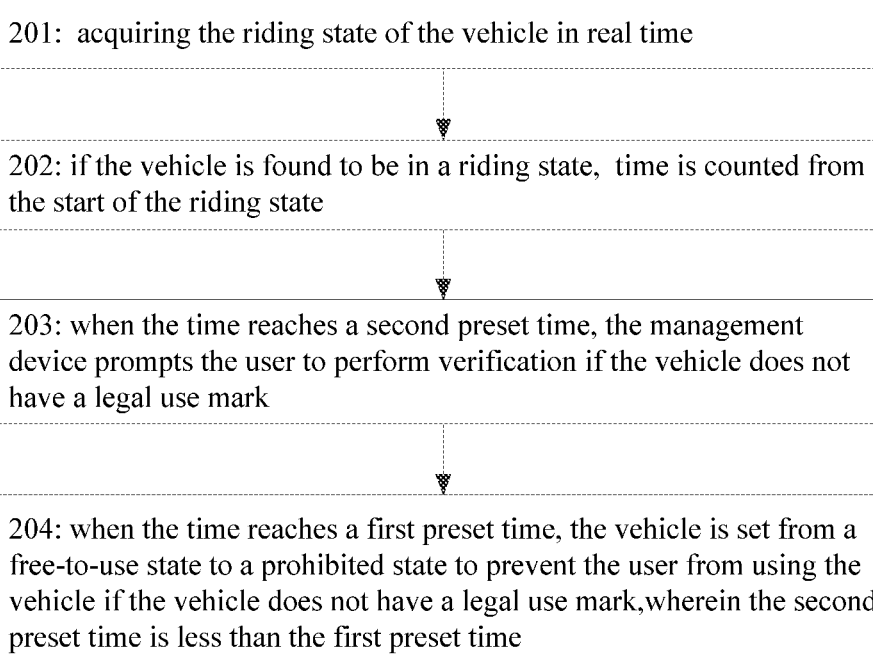
FIG. 2 is a schematic drawing of a flow chart of a vehicle management method according to an embodiment of the present invention in which a vehicle is illegally used.

FIG. 2 is a schematic drawing of a flow chart of the illegal use of a vehicle in a vehicle management method according to an embodiment of the present invention.

In the present invention, the vehicle is in a free-to-use state and is not fortified in advance. If the verification fails in the last embodiment, the vehicle may still be in a free-to-use state. In order to prevent the user from using the vehicle without verification or with verification failure, with reference to FIG. 2, the management device also has the following features.

201: the management device acquires the riding state of the vehicle in real time. The management device can acquire the riding state of the vehicle by determining the position change of the vehicle, and determines that the vehicle is ridden when an apparent change of the position of the vehicle is found. Alternatively, the management device may determine the riding state by detecting at least one of the seat pressure and the wheel rotation state. The vehicle is determined to be ridden when the seat pressure is significantly increased and/or the wheel is in a rotational condition.

202: if the vehicle is found to be in a riding state, time is counted from the start of the riding state.

203: when the time reaches a second preset time, the management device prompts the user to perform verification by means of at least one of a message displayed on a vehicle screen, a sound, a vibration and light if the vehicle does not have a legal use mark.

204: when the time reaches a first preset time, the vehicle is set from a free-to-use state to a prohibited state to prevent the user from using the vehicle if the vehicle does not have a legal use mark. The second preset time is less than the first preset time.

In other words, when finding that the vehicle is ridden, the management device will determine whether the vehicle is legally used. If not, the user will be firstly prompted to perform verification. If the user still fails in verification when the time reaches the first preset time, and the vehicle is still not legally used, the vehicle is set to be in a prohibited state to prevent the user from using.

In step 204, the management device may set the vehicle to be in a prohibited state by initiating at least one of a vehicle lock and a vehicle brake device. In step 204, the management device may prompt the user that it will disable the vehicle by means of at least one of a message displayed on a vehicle screen, a sound, a vibration and light before setting the vehicle to be in a prohibited state, so as not to cause accidental injury to the user.

Figure 3:
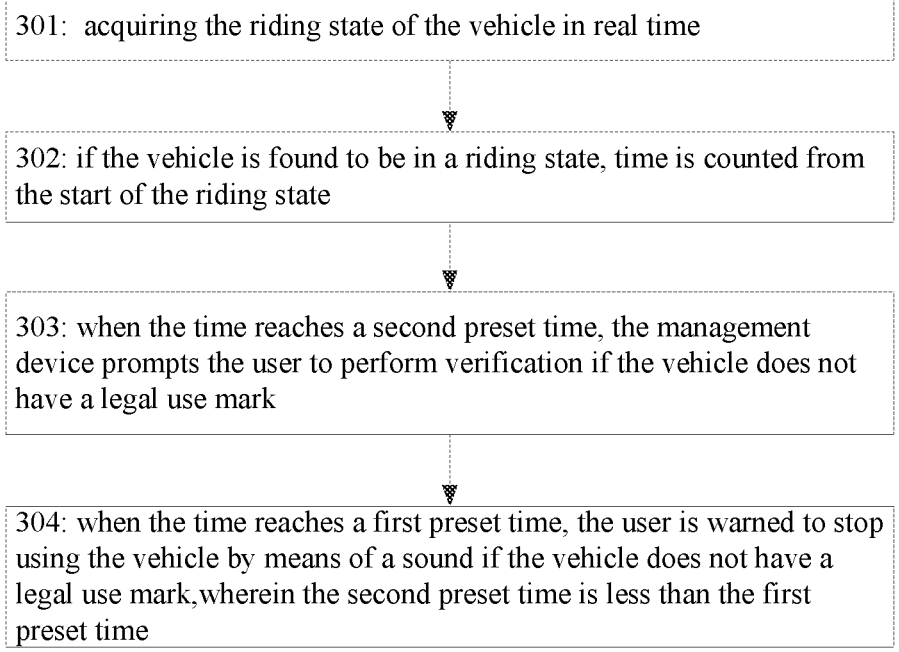
FIG. 3 is a schematic drawing of a flow chart of a vehicle management method according to another embodiment of the present invention in which a vehicle is illegally used.

FIG. 3 is a schematic drawing of a flow chart of the illegal use of a vehicle in a vehicle management method according to another embodiment of the present invention.

301: the management device acquires the riding state of the vehicle in real time. The management device can acquire the riding state of the vehicle by determining the position change of the vehicle, and determines that the vehicle is ridden when an apparent change of the position of the vehicle is found. Alternatively, the management device may determine the riding state by detecting at least one of the seat pressure and the wheel rotation state. The vehicle is determined to be ridden when the seat pressure is significantly increased and/or the wheel is in a rotational condition.

302: if the vehicle is found to be in a riding state, time is counted from the start of the riding state.

303: when the time reaches a second preset time, the management device prompts the user to perform verification by means of at least one of a message displayed on a vehicle screen, a sound, a vibration and light if the vehicle does not have a legal use mark.

304: when the time reaches a first preset time, the user is warned to stop using the vehicle by means of a sound if the vehicle does not have a legal use mark. The second preset time is less than the first preset time.

It can be seen that steps 301-303 are similar to steps 201-203. The difference between step 204 and step 304 is that in step 304, when the time reaches a first preset time, if the user still fails in the verification, and the vehicle is still illegally used, the user is warned to stop using the vehicle by means of a sound. For example, the user is warned to stop using the vehicle by means of a loud alarm, or by playing a sound warning of "illegal use, please stop using, or the police will be called". In another embodiment, the management device, while warning the user to stop using the vehicle by sound, can also upload the alarm message and the positioning information of the vehicle to the server for the vehicle's provider to process the alarm event and track the vehicle.

In the two embodiments described above, steps 203 and 303 may be omitted.

In the three embodiments described above, the user terminal is a smart card, and the management device includes a card swiping means. The smart card can be similar to a bus card, with a built-in inductance coil and powered by the management device. When the smart card is close to the card swiping means, it will send a use request; when the verification succeeds, and the smart card is close to the card swiping means again, the card will send a notification of terminating the use of the vehicle. The user terminal and the management device may communicate with each other by NFC.

The user terminal may be an electronic device carrying a virtual smart card, and the management device includes a card swiping means. The user terminal and the management device may communicate with each other by NFC.

The user terminal may be a client terminal, and may communicate with the management device by Bluetooth. The user terminal activates an operation of sending the use request to the management device by scanning a code.

In the method embodiments, the vehicle is in a free-to-use state before being used. The user may finish verification before using the vehicle or after using it for a period. This can improve the user experience. Optionally, frequent locking and unlocking of the vehicle can be avoided, thereby extending the service life of the vehicle lock.

<Management Device Mounted on Vehicle>

For those skilled in the art, the above solution of a vehicle management method may be realized by hardware, software or a combination thereof. Based on the same inventive concept, FIG. 4 illustrates a management device mounted on a vehicle according to an embodiment of the present invention.

Figure 4:
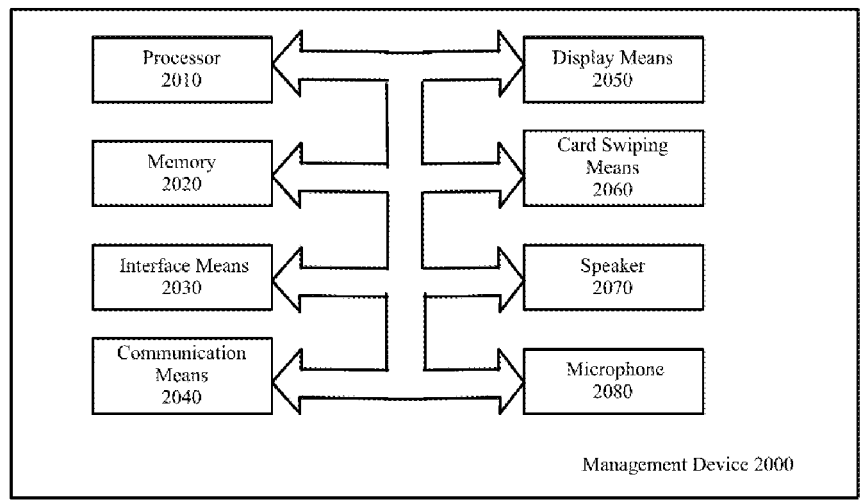
FIG. 4 is a block diagram illustrating a management device according to an embodiment of the present invention.

As shown in FIG. 4, the management device 2000 may include a processor 2010, a memory 2020, an interface means 2030, a communication means 2040, a display means 2050, a card swiping means 2060, a speaker 2070, a microphone 2080 and the like.

The processor 2010 may be a central processing unit CPU, a micro central processing unit MCU or the like, for example. The memory 2020 may include a ROM, a RAM, a non-volatile memory such as a hard disk, and the like, for example. The interface means 2030 may include a USB interface and the like, for example. The management device 2000 may be updated or maintained via the interface means 2030.

For example, the communication means 2040 can perform wired or wireless communication, such as NFC, 2G/3G/4G communication, Bluetooth communication or the like.

For example, the display means 2050 may be a liquid crystal screen, a touch display screen or the like. The user can input/output voice information via the speaker 2070 and the microphone 2080.

The management device shown in FIG. 4 is only illustrative, and is not intended to limit the present invention, or its application or use.

In this embodiment, the memory 2020 is used to store executable instructions. When the management device 2000 operates, the executable instructions control the processor 2010 to perform the operations performed by the management device 2000 in the vehicle management method described with reference to FIGS. 1-3 as above. Those skilled in the art should understand that although multiple means are shown in FIG. 4, the present invention may only relate to some of them, such as the processor 2010 and the memory 2020. Those skilled in the art can design the instructions according to the solutions disclosed by the present invention. How the instructions control the processor to operate belongs to the common sense in the art and will not be described in detail.

The management device mounted on a vehicle may include at least one of a positioning means, a seat pressure sensing means and a wheel movement sensing means to assist detection of the riding state of the vehicle. The management device may further include at least one of a vehicle braking means and a lock means to prohibit use of the vehicle if necessary. For example, the vehicle braking means may be a brake. The management device may further include at least one of a vibration means, an indication lamp, a speaker and a display screen to prompt the user to perform verification if necessary or to prompt the user to stop using the vehicle.

The management device mounted on a vehicle may include a memory and a processor, wherein the memory stores executable instructions for controlling the processor to perform the operations of: setting a vehicle in a free-to-use state in advance; receiving a use request from a user terminal, the use request including an identification of the user terminal and verification information; verifying the user terminal based on the verification information; and when the verification succeeds, marking by the management device the vehicle with a legal use mark, and continuing the free-to-use state of the vehicle.

Optionally, the executable instructions are further configured for controlling the processor to perform the operation of: when the verification fails, continuing the free-to-use state of the vehicle.

Optionally, the executable instructions are further configured for controlling the processor to perform the operations of: receiving a notification of stopping use of the vehicle from the user terminal, the notification including the identification of the user terminal; and after receiving the notification, canceling the legal use mark.

Optionally, the use request further includes balance data of the user terminal, and the executable instructions are further configured for controlling the processor to perform the operation of: after receiving the notification, calculating an amount consumed by the user and sending a command of rewriting the balance data to the user terminal.

Optionally, the executable instructions are further configured for controlling the processor to perform the operations of: acquiring a riding state of the vehicle; counting time from a start of the riding state, and if the time reaches a first preset time and the vehicle does not have the legal use mark, switching the vehicle from the free-to-use state to a prohibited state to prohibit a user from using the vehicle.

Optionally, the executable instructions are further configured for controlling the processor to perform the operation of: before switching the vehicle to the prohibited state, prompting the user that the vehicle will be prohibited using at least one of a message displayed on a vehicle screen, a sound, a vibration and light.

Optionally, the executable instructions are further configured for controlling the processor to perform the operations of: acquiring a riding state of the vehicle; counting time from a start of the riding state, and if the time reaches a first preset time and the vehicle does not have the legal use mark, warning the user to stop using the vehicle by a sound.

Optionally, the executable instructions are further configured for controlling the processor to perform the operation of: if the time reaches a second preset time and the vehicle does not have the legal use mark, prompting the user to perform verification using at least one of a message displayed on a vehicle screen, a sound, a vibration and light, the second preset time being smaller than the first preset time.

Optionally, the management device acquires the riding state of the vehicle by determining a position change of the vehicle.

Optionally, the management device determines the riding state by detecting at least one of a seat pressure and a wheel rotation state.

Optionally, the management device sets the vehicle in a prohibited state by activating at least one of a lock and a vehicle braking means.

Optionally, the management device includes a card swiping means.

Optionally, the user terminal and the management device communicate with each other by NFC or Bluetooth.

In the embodiments of the management device, the vehicle is in a free-to-use state before being used. The user may finish verification before using the vehicle or after using it for a period. This can improve the user experience. Optionally, frequent locking and unlocking of the vehicle can be avoided, thereby extending the service life of the vehicle lock.

Those skilled in the art well know that, as electronic and information technologies such as large scale integrated circuit technologies develop and the trend that software are realized by hardware advances, it becomes difficult to distinguish software and hardware of computer systems, since any operation or execution of any instruction can be realized by software or hardware. Whether to realize a function of a machine using a software or hardware solution may depend on non-technical factors such as prices, speeds, reliability, storage capacity, change period etc. For those skilled in the art, realization by software and by hardware is equivalent. Those skilled in the art can select software or hardware to realize the above solutions. Therefore, the specific software or hardware will not be defined here.

<Vehicle>

Figure 5:
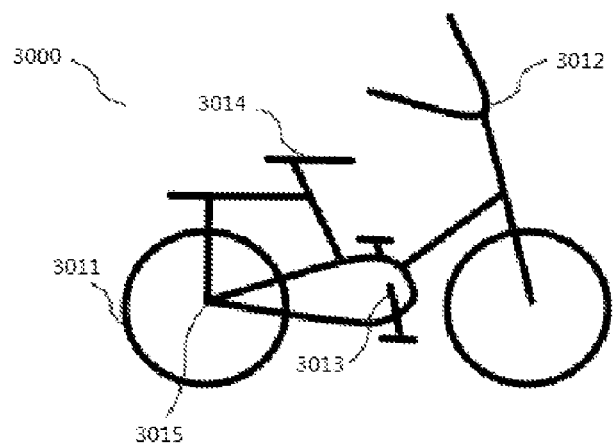
FIG. 5 is a block diagram illustrating a vehicle according to an embodiment of the present invention.

FIG. 5 is a schematic view of the vehicle according to another embodiment of the present invention. FIG. 5 shows a bicycle. However, those skilled in the art should understand that the vehicle 3000 may be other vehicles such as an electric vehicle, a motor cycle, an automobile or the like.

As shown in FIG. 5, for example, the bicycle 3000 includes wheels 3011, a handlebar 3012, pedals 3013, a seat 3014, a shaft 3015 and the above management device. The various means in the above management device may be arranged in the bicycle in FIG. 5. For example, the vibration means and/or the sound generation means and/or the indication lamp may be arranged on the handlebar 3012. The display screen may be arranged on the handlebar 3012. The wheel movement sensing means and/or the braking means may be arranged on the wheel 3011 or the shaft 3015. The pressure sensing means may be arranged on the seat 3014.

The vehicle shown in FIG. 5 is only exemplary and does not intend to limit the present invention.

It should be noted that the respective embodiments of the present description are described in a progressive manner, the focus of each embodiment illustrates the differences from other embodiments, and the same or similar parts among the embodiments may refer to one another. However, those skilled in the art should understand that the above embodiments may be used individually or in combination according to the needs. In addition, as the device embodiments correspond to the method embodiments, the description of the former is relatively simpler, and the related parts may refer to the corresponding parts of the method embodiments. The above-described system embodiments are only illustrative. The modules in these systems described as separate components may be or may not be physically separated.

Further, the flow charts and block diagrams in the drawings show the possible system architecture, functions and operations of the systems, methods and computer program products of multiple embodiments according to the present invention. In this regard, each block in the flow charts and block diagrams may represent one module, or a part of a program segment or codes, which includes one or more executable instructions for realizing predefined logic functions. It should also be noted that in some alternative implementations, the function described in one block may be realized in a sequence difference from that described in the drawings. For example, two consecutive blocks may be executed substantially in parallel, and may be executed in an inverse sequence, depending on the related functions. It should also be noted that each block in a block diagram and/or a flow chart and a combination of the blocks in a block diagram and/or a flow chart may be realized by a specific hardware-based system for performing a predefined function or action or may be realized by a combination of specific hardware and computer instructions.

The computer program products provided by the embodiments of the present invention include computer-readable storage media storing program codes. The instructions included in the program codes may be used to perform the methods in the above-described method embodiments. The specific implementations may refer to the method embodiments and will not be repeated herein.

Those skilled in the art may clearly understand that for the sake of convenience and conciseness in description, the specific work processes of the above-described systems, devices and units may refer to the corresponding processes in the above-described method embodiments and will not be repeated herein.

In the embodiments provided by the present application, it should be understood that the disclosed systems, devices and methods may be realized by other means. The above-described device embodiments are merely illustrative. For example, division of the units is only a logical functional division, and may be realized by other division manners in actual application. For example, multiple units or components may be combined or integrated into another system, or some features may be omitted or may not be executed. Further, the coupling or direct coupling or communication connection illustrated or discussed here may be realized through communication interfaces, and indirect coupling or communication connection between the devices or units may be electrical, mechanical or in other forms.

The units described as separated components may be or may not be physically separated. The components displayed as units may be or may not be physical units, may be located at the same place and may be distributed to multiple network units. A part or all of the units may be selected to realize the purposes of the solutions of the embodiments according to the actual needs.

In addition, the functional units in the embodiments of the present invention may be integrated in a processing unit, or may exist as physically independent units. Two or more units may be integrated into one unit.

When the function is realized in a form of a software function unit and is sold or used as an independent product, it may be stored in a computer-readable storage medium. Based on such understandings, the technical solutions of the present invention or the part thereof contributing to the prior art or a part thereof may be substantially reflected in the form of a software product. The computer software product is stored in a storage medium, and includes several instructions to cause a computer device (which may be a personal computer, a server or a network device) to perform all or part of the steps for performing the methods of the embodiments of the present invention. The storage medium includes a USB disk, a mobile hard disk, a Read-only Memory, a Random Access Memory, a magnetic disk or an optical disk which can store program codes.

It can be appreciated that, while the terms "first", "second" and so on may be used herein to distinguish one entity or operation from another, it does not require or imply such a relation or sequence between these entities or operations.

Further, the terms "include", "comprise" or any variation thereof are intended to cover an nonexclusive containing, such that a process, a method, an item or a device containing a series of elements not only includes these elements, but also includes other elements that are not set forth specifically, or also includes an inherent element of such a process, method, item or device. Without further limitation, an element defined by a phrase "include a" does not mean that other identical elements are excluded from the process, method, item or device.

The above are only preferred embodiments of the present invention and is not intended to limit the present invention. For those skilled in the art, the present invention may have various modifications and changes. Any amendment, equivalent substitution or improvement made within the spirit and principle of the present invention shall be contained in the protection scope of the present invention. It should be noted that similar signs and letters in the following drawings represent similar items. Therefore, once defined in one drawing, an item may not be further discussed in the followed drawings.

While certain specific embodiments of the present invention have been illustrated by way of example, it will be understood by those skilled in the art that the foregoing examples are provided for the purpose of illustration and are not intended to limit the scope of the present invention. It will be understood by those skilled in the art that the foregoing embodiments may be modified without departing from the scope and spirit of the invention. The scope of the present invention is subject to the attached claims.

What is claimed is:

1. A vehicle management method, comprising the following steps:
   setting a vehicle in a free-to-use state in advance;
   receiving a use request by a management device mounted on the vehicle from a user terminal, the use request including an identification of the user terminal and verification information;
   verifying the user terminal by the management device;
   when the verification succeeds, marking by the management device the vehicle with a legal use mark, and continuing the free-to-use state of the vehicle;
   the management device acquires a riding state of the vehicle; and
   when the management device counts time from a start of the riding state, if the time reaches a first preset time and the vehicle does not have the legal use mark, the vehicle is switched from the free-to-use state to a prohibited state to prohibit the user from using the vehicle.

2. The method according to claim 1, wherein when the verification fails, the management device continues the free-to-use state of the vehicle.

3. The method according to claim 1, wherein further comprising the following steps:
   receiving by the management device a notification of stopping use of the vehicle from the user terminal, the notification including the identification of the user terminal; and
   after receiving the notification, canceling the legal use mark by the management device.

4. The method according to claim 1, wherein before the management device switches the vehicle to the prohibited state, the management device prompts the user that the vehicle will be prohibited using at least one of a message displayed on a vehicle screen, a sound, a vibration and a light.

5. A management device mounted on a vehicle, comprising a memory and a processor, wherein the memory stores executable instructions for controlling the processor to perform the operations of:
   setting a vehicle in a free-to-use state in advance;
   receiving a use request from a user terminal, the use request including an identification of the user terminal and verification information;
   verifying the user terminal based on the verification information;
   when the verification succeeds, marking by the management device the vehicle with a legal use mark, and continuing the free-to-use state of the vehicle;
   acquiring a riding state of the vehicle; and
   counting time from a start of the riding state, and if the time reaches a first preset time and the vehicle does not have the legal use mark, switching the vehicle from the free-to-use state to a prohibited state to prohibit a user from using the vehicle.

6. The device of according to claim 5, wherein the executable instructions are further configured for controlling the processor to perform the operation of: when the verification fails, continuing the free-to-use state of the vehicle.

7. The device of according to claim 5, wherein the executable instructions are further configured for controlling the processor to perform the operations of:
   receiving a notification of stopping use of the vehicle from the user terminal, the notification including the identification of the user terminal; and
   after receiving the notification, canceling the legal use mark.

8. The device of according to claim 7, wherein the use request further includes balance data of the user terminal, and
   the executable instructions are further configured for controlling the processor to perform the operation of: after receiving the notification, calculating an amount consumed by the user and sending a command of rewriting the balance data to the user terminal.

9. The device of according to claim 5, wherein the executable instructions are further configured for controlling the processor to perform the operation of: before switching the vehicle to the prohibited state, prompting the user that the vehicle will be prohibited using at least one of a message displayed on a vehicle screen, a sound, a vibration and a light.

10. A management device mounted on a vehicle, comprising a memory and a processor, wherein the memory stores executable instructions for controlling the processor to perform the operations of:
    setting a vehicle in a free-to-use state in advance;
    receiving a use request from a user terminal, the use request including an identification of the user terminal and verification information;
    verifying the user terminal based on the verification information;
    when the verification succeeds, marking by the management device the vehicle with a legal use mark, and continuing the free-to-use state of the vehicle;
    acquiring a riding state of the vehicle;
    counting time from a start of the riding state, and if the time reaches a first preset time and the vehicle does not have the legal use mark, warning the user to stop using the vehicle by a sound.

11. The device of according to claim 5, wherein the executable instructions are further configured for controlling the processor to perform the operation of: if the time reaches a second preset time and the vehicle does not have the legal use mark, prompting the user to perform verification using at least one of a message displayed on a vehicle screen, a sound, a vibration and a light, the second preset time being smaller than the first preset time.

12. The device of according to claim 5, wherein the management device acquires the riding state of the vehicle by determining a position change of the vehicle.

13. The device of according to claim 5, wherein the management device determines the riding state by detecting at least one of a seat pressure and a wheel rotation state.

14. The device of according to claim 5 wherein the management device sets the vehicle in a prohibited state by activating at least one of a lock and a vehicle braking means.

15. The device of according to claim 5, wherein the management device includes a card swiping means.

16. The device of according to claim 5, wherein the user terminal and the management device communicate with each other by NFC or Bluetooth.

17. The device of according to claim 5, wherein the executable instructions are further configured for controlling the processor to perform the operation of: recording a use condition of the vehicle for each time of use, and periodically reporting the use condition to a server.

18. A vehicle comprising the management device of according to claim 5.

* * * * *